March 28, 1967 W. J. HAYWARD 3,311,200
HYDRODYNAMIC BRAKE
Filed Dec. 18, 1963 7 Sheets-Sheet 1
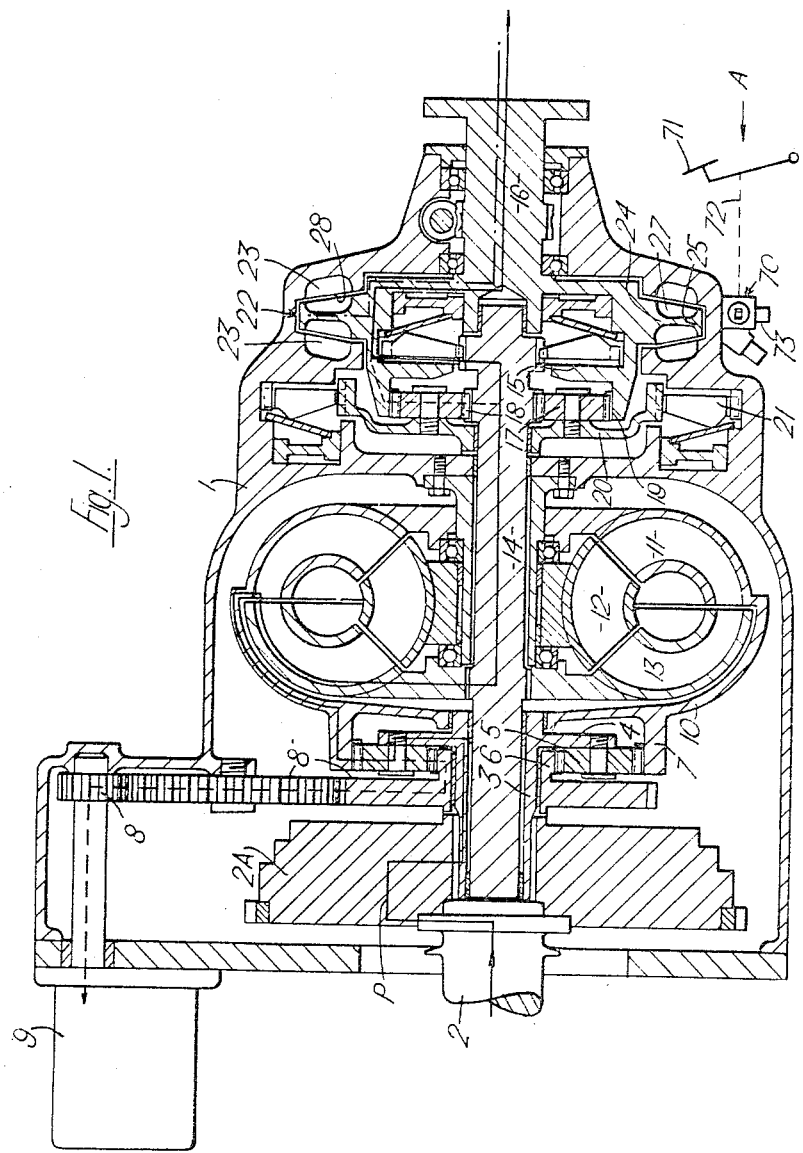
Inventor
WILLIAM J. HAYWARD
By Barnard, McGlynn & Reising
Attorneys

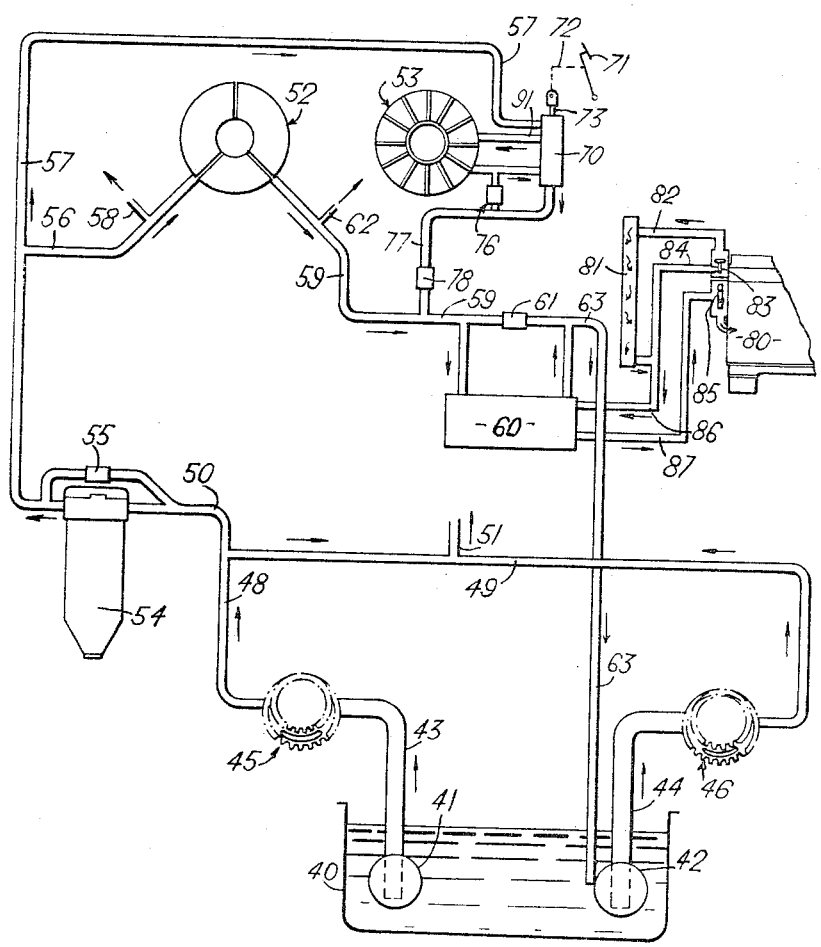

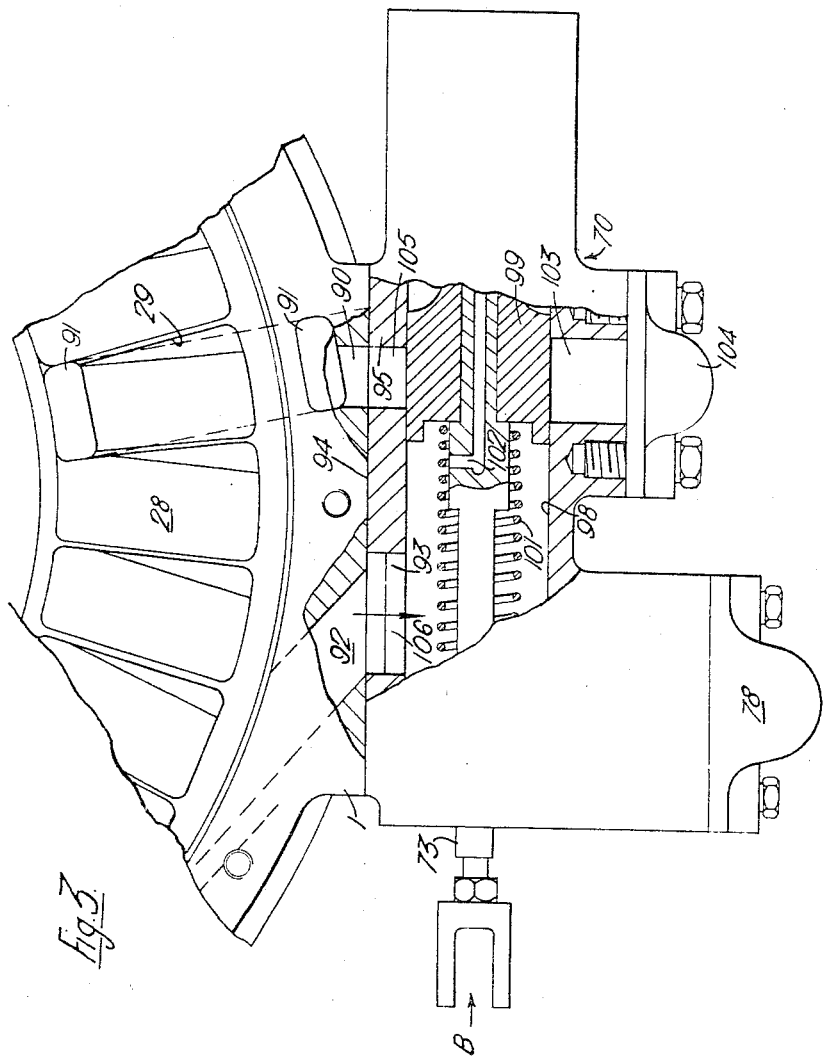

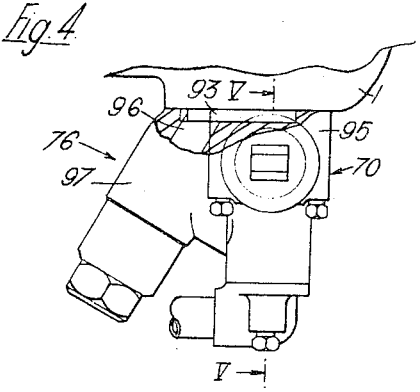
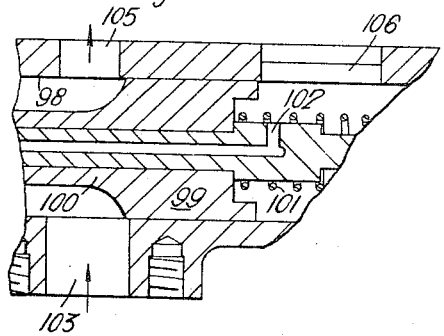
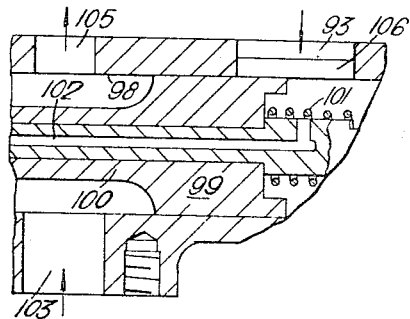

March 28, 1967

W. J. HAYWARD 3,311,200

HYDRODYNAMIC BRAKE

Filed Dec. 18, 1963

Inventor
WILLIAM J. HAYWARD
By
Barnard, McGlynn & Reising
Attorneys

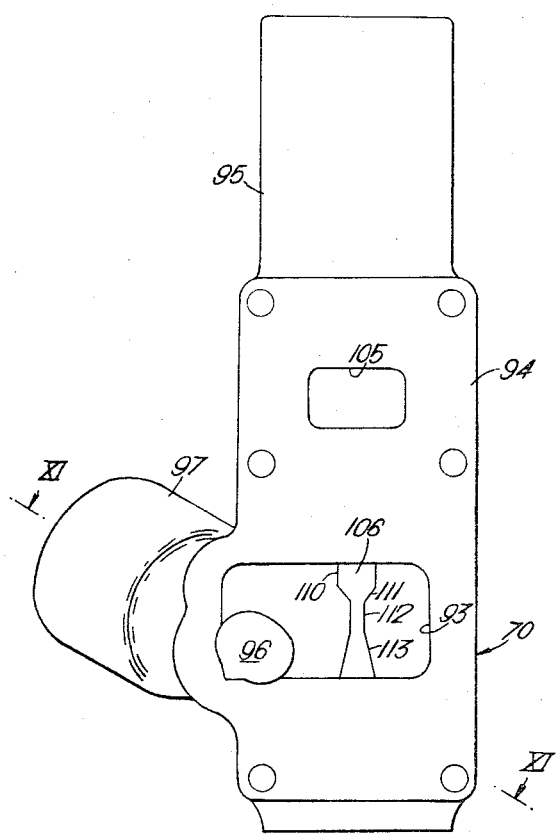

March 28, 1967 W. J. HAYWARD 3,311,200
HYDRODYNAMIC BRAKE
Filed Dec. 18, 1963 7 Sheets-Sheet 7
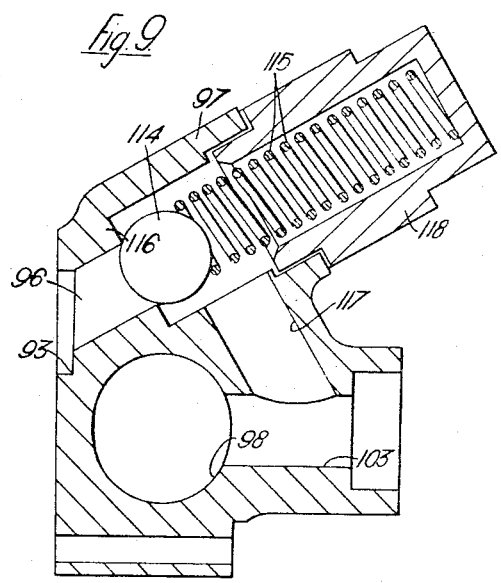
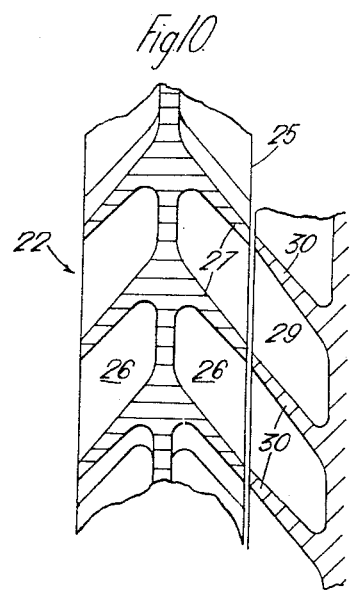
Inventor
WILLIAM J. HAYWARD
By
Barnard, McGlynn & Reising
Attorneys

United States Patent Office 3,311,200
Patented Mar. 28, 1967

3,311,200
HYDRODYNAMIC BRAKE
William J. Hayward, Peterborough, England, assignor, by mesne assignments, to F. Perkins Engines Limited, London, England, a British company
Filed Dec. 18, 1963, Ser. No. 331,451
Claims priority, application Great Britain, Dec. 27, 1962, 48,675/62
4 Claims. (Cl. 188—90)

This invention relates to hydrodynamic brakes, and is particularly but not exclusively applicable to a hydrodynamic brake incorporated in a vehicle transmission, that is to say, an inboard hydrodynamic brake which operates on a component of the vehicle transmission.

In one field to which the invention is applicable, namely the braking of vehicles, the introduction of infinitely variable power transmissions usually results in the disadvantage that in the "over-run" condition where the vehicle engine is attempting to decelerate the drive wheels, the transmission does not transmit sufficient torque in the reverse direction to effect reasonable deceleration. Furthermore with a conventional fixed ratio gear box the degree of engine braking can be chosen, within limits, by selecting any one of the forward drive gears. Thus it can be seen that efficient engine braking is not generally available to the driver of a vehicle incorporating an infinitely variable transmission due to the fact that such a transmission usually incorporates elements which are non-reversible, that is, will transmit forces in the one direction but not in the other, and wherein the choice of gear ratio is usually determined by the load to be overcome or some other factor not having reference to the vehicle driver.

It is an object of the present invention to provide a hydrodynamic brake which obviates or mitigates the above disadvantages.

Another object of the present invention is to provide a hydrodynamic brake having a brake chamber housing defining a brake chamber, an inlet into said chamber, a source of fluid under pressure in communication with said inlet, an outlet from said chamber, a reaction member disposed inside said chamber, a rotor adapted to impel fluid towards said reaction member and control means including a selectively variable valve providing a variable restriction in said outlet, whereby the volume of fluid present in said chamber can be varied thereby varying the braking effect on the rotor.

It is yet another object of the invention to provide a power transmission mechanism including in combination a hydrodynamic brake, a differential gear train, an input shaft, first means drivingly connecting one element of the differential gear train to the input shaft, a supercharger drive, second means drivingly connecting a second element of said differential gear train to said supercharger drive, and third means drivingly connecting a third element of said differential gear train to the rotor of said hydrodynamic brake.

An embodiment of the invention will now be described by way of example with reference to the accompanying drawings in which:

FIGURE 1 is a vertical cross section on the center line of a transmission assembly incorporating a hydrodynamic brake;

FIGURE 2 is a hydraulic circuit diagram and relates to the transmission shown in FIGURE 1;

FIGURE 3 shows a fragmentary axial view on arrow A in FIGURE 1 and a partial section through the control valve and the positioning of the valve in relation to a part of the brake housing;

FIGURE 4 is a fragmentary view of the control valve looking in the direction of arrow B in FIGURE 3;

FIGURES 6 and 7 are fragmentary cross sections similar to FIGURE 5 and show two operative positions of the control valve;

FIGURE 8 shows a view on the top face of the control valve as seen in FIGURE 5;

FIGURE 9 shows a cross section through the control valve on the line IX—IX in FIGURE 8; and FIGURE 10 shows a cross section of the blading of the rotor and stator of the hydrodynamic brake.

Figure 5:
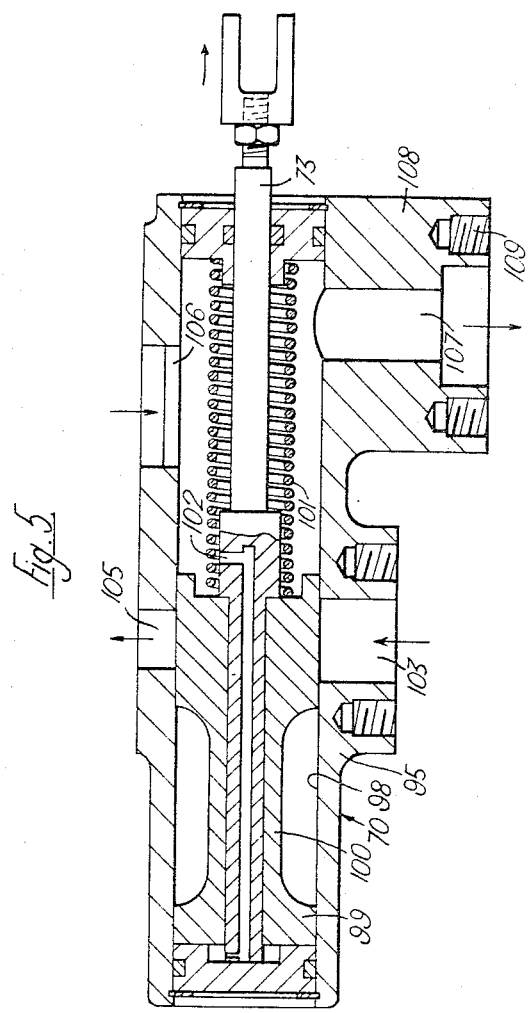
FIGURE 5 shows a cross section through the control valve on line V—V in FIGURE 4 looking in the direction of the arrows.

Referring now to the drawings, the transmission assembly shown in FIGURE 1 includes generally an epicyclic differential gear train, a supercharger drive, a torque converter and a selective forward, neutral or reverse epicyclic gear train, and a hydrodynamic brake. The whole of this assembly is enclosed in a transmission housing 1.

An engine crankshaft 2 drives through a flywheel 2A and an input shaft 3 to a planet carrier 4 of an epicyclic differential. Planet gear wheels 5 mesh with a sun gear wheel 6 and a ring gear wheel 7, and the power flow path P is divided by this means, a smaller part being transmitted through a set of meshing gears 8 to a supercharging compressor 9 while the majority of the power is transmitted through the ring gear 7, an impeller support member 10 and an impeller 11 of a three or four element hydrodynamic torque converter. The elements of the torque converter comprise the impeller 11, one or two reaction runners 12 and a turbine 13. From the impeller 11 the power passes to the turbine 13 in known manner and thence to an intermediate shaft 14. The power flow from the intermediate shaft 14 is alternatively through a fluid pressure operated direct drive clutch 15 into the output shaft 16 or through planetary pinions 17 of an epicyclic gear train. The sunwheel 18 of this train is secured to or integral with the intermediate drive shaft 14 and the ring gear 19 is secured to the output shaft 16. The planet pinion carrier 20 is restrained from rotation by engagement of a fluid pressure operated reverse brake 21 associated with it.

It can be arranged by suitable use of fluid pressure in known manner that the direct drive clutch 15 is actuated to give a direct drive from intermediate shaft 14 to the output shaft 16 the reverse brake 21 being disengaged when this happens so that the planet pinions 17 and their carrier idle. On disengagement of the direct drive clutch 15, the reverse brake 21 being also disengaged, no drive at all is transmitted to the output shaft 16 so that the transmission is in a neutral condition. On engagement of the reverse brake 21 the planet carrier 20 is prevented from rotating and thus holds the planet pinions 17 so that they transmit and reverse the direction of the drive to the ring gear 19 and output shaft 16.

The hydrodynamic brake, to be known as the brake, is conveniently integrated into the transmission. To this end the rotor 22 of the brake is mounted for rotation with the output shaft 16, whilst the stator 23 is formed integrally with the transmission housing 1. The rotor 22 is formed with a supporting web 24 and a peripheral portion 25. Pockets or cells 26 are formed in the peripheral portion 25 and are separated from each other by vanes 27. FIGURE 10 shows how the vanes 27 are inclined to the axial direction of the rotor in the preferred embodiment. The rotor 22 is mounted for rotation in a toroidal hollow brake chamber 28 which closely matches the shape of the peripheral portion 25 of the rotor. Cells 29, FIGURE 10, similar to those on the rotor, are formed in the stationary transmission housing and are presented generally towards the cells 26. The vanes 30 separating the cell 29 are also inclined to the axial direction but oppositely to the vanes 27 as seen in FIGURE 10.

FIGURE 2 shows the hydraulic circuit diagrammatically. Oil suitable for use in torque converters is contained in a sump 40. The oil is drawn up from the sump by two gear pumps 45 and 46 via coarse filters 41 and 42 and pipes 43 and 44. The pumps are both of the gear type and the front oil pump 45 is driven at a speed proportional to engine speed while the rear oil pump 46 is driven at a speed proportional to the vehicle speed by a suitable drive taken from the output shaft. The pumps deliver through passages 48 and 49 to passages 50 and 51. Passage 50 constitutes the oil pressure supply to the torque converter 52 and brake 53 while the passage 51 forms the pressure supply route for the fluid pressure operated clutch 15 and brake 21 referred to previously. The operation of the clutch 15 and brake 21 forms no part of the invention and will not, therefore, be described. It should be noted that both pumps supply to passage 50; the reason for this is that the transmission is such that an engine driven pump, alone, under certain conditions, might be incapable of supplying sufficient pressure to operate the brake; e.g. under conditions of downhill coasting the engine runs very slowly and might not drive the pump fast enough. This condition is remedied by arranging for the vehicle output shaft to drive an additional pump.

Oil from passage 50 passes through a filter 54 which is provided with a by-pass valve 55. A pressure drop will occur through the filter 54 or its by-pass valve 55 and the pressure in passages 56 and 57 leading to the torque converter 52 and brake 53, respectively, will, therefore, be lower than the pressure in passage 50. A tapping 58 feeds oil to the supercharging compressor 9 for lubrication of the latter.

Oil leaving the converter 52 flows through passage 59, to an oil cooler 60 which has a by-pass valve 61 set to relieve at a relatively low figure of 10 p.s.i. or so. A tapping 62 off passage 59 provides lubrication oil for the differential gear train. The discharge from the cooler 60 passes to the sump 40 through a passage 63.

The passage 57 is connected to a brake control valve 70, to be described in more detail later. The control valve 70 is capable of being conditioned to control the volume of oil within the brake chamber 28 of the brake 53. The conditioning of the control valve 70 is effected by a pedal 71 or like member movable by the driver of the vehicle and operative through linkages, fluid pressure means or like known control means, represented by dotted line 72, to displace a control rod 73. Displacement of the control rod 73 normally allows fluid to enter the brake 53 through the brake inlet passage 91 and to leave through the brake outlet passage 92. In order to prevent an excessive build-up of pressure within the brake a relief valve 76 is provided which allows oil to by-pass a part of the control valve 70. Discharged oil from the control valve 70 or relief valve 76 flows through a passage 77 and subsequently through a non-return valve 78 to the passage 59, leading to the cooler 60 and subsequently to the sump 40.

The oil cooler 60 is connected to the water cooling system of the engine 80 which drives the transmission. The water cooling system is provided with the usual radiator 81 which receives water through a hose 82 discharged from the engine past a thermostat 83. The radiator 81 can be by-passed by a hose 84 when the thermostat 83 is closed. In conventional systems the water from the bottom of the radiator 81 is drawn up by the engine driven water pump 85 and recirculated through the engine 80. In the present arrangement, however, relatively cool water from the bottom of the radiator 81 is led to the oil cooler 60 through passage 86 and back to the water pump 85 through passage 87. Thus the hot oil discharged from the torque converter 52 and brake 53 is cooled by the coolest water available in the engine and transmission installation, and the risk of overheating of the oil is minimized.

It should be noted that the word "passages" is to be interpreted as being generic to pipes, hoses, oilways, oil galleries and any other known means for permitting the flow of fluid from one place to another within an enclosed transmission.

The control valve 70 is positioned at the bottom of the transmission (see FIGURE 3) and is attached to the outside of the transmission housing 1 adjacent to the brake chamber 28. The brake inlet passage is formed as an oilway 91 in the stator housing extending from an inlet port 90 into the brake chamber 28 at the radially inner end of one of the stator cells 29. The brake outlet passage 92 previously referred to is constituted by a bore extending tangentially through the transmission housing 1 from the outer periphery of the brake chamber 28 to a point on the outside of the transmission housing 1. The passage 92 tapers axially outwardly so that its shape at its exit end is similar and corresponds to the shallow pocket 93 in the top face 94 of the control valve housing 95. The view of the control valve 70 as seen in FIGURE 4 shows how the pocket 93 extends so that a relief passage 96 leading to the relief valve 76 communicates with it. The housing 97 for the relief valve 76 is formed integrally with the control valve housing 95.

The cross section of the control valve 70 seen in FIGURE 5 shows a bore 98 in the housing 95 closed tightly at both ends against fluid leakage and having a plunger 99 slidable therein. The plunger has a waisted portion 100 and is secured to a control rod 73 and is biased by a spring 101 towards the position seen in FIGURE 5. A drilled passage 102 in the rod 73 allows fluid to pass from one end of the plunger 99 to the other so that it is pressure balanced; that is, there is no force exerted on the plunger 99 as a result of fluid pressure within the control valve.

Provision is made for replacing spring 101 with springs of different strength in order to vary the resistance to movement of the plunger and thus the "feel" of the brake. Alternative means (not shown) may also be provided for varying the spring pressure.

A supply port 103 is provided in the wall of the control valve which is adapted to be connected by a suitable pipe union 104 (see FIGURE 3) to the passage 57 for receiving oil under pressure. A brake inlet port 105 leading to the passage 91 (FIGURE 3) is positioned diametrically opposite to the supply port 103 in the housing 95 of the central valve. The oil discharged from the brake normally passes through a brake outlet port 106 formed in the wall of the housing 95; the shape of the outlet port 106 is important as will be seen later. Almost diametrically opposite the outlet port 106 an exhaust port 107 is provided in a boss 108 which is adapted by means of the threaded holes 109 to carry a non-return valve 78.

The operation of the valve will now be described with reference to FIGURES 5, 6 and 7. The plunger 99 as seen in FIGURE 5 masks the supply port 103 and thus prevents fluid from entering the brake, while the outlet port 106 and exhaust port 107 are completely unmasked by the plunger 99 and so any fluid present in the brake is permitted to drain therefrom.

FIGURE 6 shows a position of the plunger 99 in the bore 98 wherein both the supply port 103 and brake inlet port 105 are open, thus allowing fluid to enter the brake 53 (FIGURE 2). It should be noted that the brake outlet port 106 remains fully open. A small degree of braking is achieved by the brake when the control valve is in this condition.

FIGURE 7 illustrates the condition of the control valve when oil is entering the brake through the ports 103 and 105 and the braking is being regulated by controlling the outflow of oil from the brake. The degree of braking is dependent on the speed of rotation of the rotor and upon the volume of oil within the brake. By limiting the outflow of oil by masking the outlet port 106 with the plunger 99 it is possible to control the amount of oil present in the brake.

FIGURE 8 shows the shape of the port 106. It will be seen that the shape has a parallel portion 110, a sharply inwardly tapering portion 111, a second parallel portion 112, and a finely outwardly tapering portion 113. This shape of port gives progressive response to movement of the pedal 71 through the linkage 72, the rod 73 and the plunger 99, and enables the driver of the vehcile to select the degree of braking he requires. At no time is the braking system likely to be in a condition where it is uncontrollable.

FIGURES 8 and 9 show how the relief valve, shown diagrammatically as 76 in FIGURE 2, is incorporated into the control valve housing. The housing 97 formed on the side of the control valve housing 95 contains a passage 96 one end of which communicates with the pocket 93 (see FIGURE 4 also) while the other end is normally closed by a ball valve 114 loaded by a spring 115 onto a seat 116 found in the passage 96. A cross passage 117 joins the passage 96 with the exhaust port 103. When the outlet port 106 is fully masked by the plunger 99, the pressure in the brake chamber builds up to a point where the relief ball valve 114 unseats and permits the outlet port 106 to be by-passed. A detachable cap 118 encloses and retains the spring 115 so that the spring 115 can be changed for one of different strength if the need arises.

An advantage of the particular construction described is the low pressure cooling of the hot oil discharged from both the torque converter and the brake. The additional use of the two oil pumps 45 and 46 results in a substantially constant flow of cool oil to both converter and brake at all vehicle speeds.

I claim:

1. A hydrodynamic brake comprising; a brake chamber, an inlet into said chamber, a source of fluid under pressure in communication with said inlet, an outlet from said chamber, a reaction member disposed inside said chamber, a rotor adapted to impel fluid towards said reaction member, and control means including a selectively movable valve, means connecting said inlet and said outlet with said valve, and biasing means continuously biasing said valve toward a first position in which said inlet is closed and said outlet is open, said valve movable between said first position and a second position in which said inlet is completely open and said outlet is completely open to meter flow through said inlet and thereafter movable between said second position and a third position to meter flow through said outlet as said inlet is maintained completely open said valve being movable in a single linear direction from said first position to said second position and then to said third position, and vice versa.

2. A hydrodynamic brake as defined in claim 1 wherein said valve comprises a plunger fluid tightly slidable within a bore, said plunger having one land for closing said inlet when in said first position and for metering flow through said outlet when disposed between said second and third positions.

3. A hydrodynamic brake as defined in claim 2 including means defining the shape of said outlet so that the change in flow therethrough resulting from an increment of linear movement of said valve between said second and third positions is different for different equal increments of linear movement in the same direction between said second and third positions.

4. A hydrodynamic brake as defined in claim 3 wherein said outlet includes a parallel portion, followed by a sharply inwardly tapering portion, followed by a narrow parallel portion, followed by a finely outwardly tapering portion.

References Cited by the Examiner

UNITED STATES PATENTS

| | | | |
|---|---|---|---|
| 2,059,591 | 11/1936 | Leoni | 74—293 |
| 2,496,497 | 2/1950 | Russell | 188—264 |
| 2,541,227 | 2/1951 | Findley | 188—264 |
| 2,750,009 | 6/1956 | Pohl | 188—90 |
| 2,889,013 | 6/1959 | Schneider | 188—90 |
| 2,946,416 | 7/1960 | Christenson | 188—90 |
| 2,990,919 | 7/1961 | Snoy | 192—4 |
| 3,124,218 | 3/1964 | Montgomery | 188—90 |
| 3,136,392 | 6/1964 | Rodway | 188—90 |
| 3,146,630 | 9/1964 | Ivey | 74—472 |
| 3,189,048 | 6/1965 | Parker et al. | 137—625.17 |

FOREIGN PATENTS

| | | |
|---|---|---|
| 674,364 | 11/1963 | Canada. |
| 1,264,983 | 5/1961 | France. |

MARK NEWMAN, *Primary Examiner.*

DAVID J. WILLIAMOWSKY, *Examiner.*

J. R. BENEFIEL, *Assistant Examiner.*